US009648022B2

(12) United States Patent
Peterka et al.

(10) Patent No.: US 9,648,022 B2
(45) Date of Patent: May 9, 2017

(54) DIGITAL RIGHTS DOMAIN MANAGEMENT FOR SECURE CONTENT DISTRIBUTION IN A LOCAL NETWORK

(71) Applicant: Verimatrix, Inc., San Diego, CA (US)

(72) Inventors: Petr Peterka, San Diego, CA (US); Niels J. Thorwirth, San Diego, CA (US)

(73) Assignee: Verimatrix, Inc., San Diego, CA (US)

(*) Notice: Subject to any disclaimer, the term of this patent is extended or adjusted under 35 U.S.C. 154(b) by 0 days.

(21) Appl. No.: 14/970,390

(22) Filed: Dec. 15, 2015

(65) Prior Publication Data
US 2016/0099944 A1 Apr. 7, 2016

Related U.S. Application Data

(63) Continuation of application No. 13/810,886, filed as application No. PCT/US2011/044752 on Jul. 20, 2011, now Pat. No. 9,253,165.
(Continued)

(51) Int. Cl.
H04L 29/06 (2006.01)
G06F 21/10 (2013.01)
(Continued)

(52) U.S. Cl.
CPC ............ H04L 63/10 (2013.01); G06F 21/10 (2013.01); H04L 49/35 (2013.01);
(Continued)

(58) Field of Classification Search
USPC ............... 713/153, 150, 163; 726/2, 21, 36; 380/255, 264, 276
See application file for complete search history.

(56) References Cited

U.S. PATENT DOCUMENTS 9,253,165 B2 2/2016 Peterka et al.
2002/0120577 A1* 8/2002 Hans .................. G06Q 30/06 705/59
(Continued)

FOREIGN PATENT DOCUMENTS

WO      0198903 A1    12/2001
WO   WO2010042859  * 10/2009  ............ G06F 21/00
WO    2012012579 A1   1/2012

OTHER PUBLICATIONS

International Preliminary Report on Patentability for International Application No. PCT/US2011/044752, Issued Jan. 22, 2013, Mailed Jan. 31, 2013, 6 Pgs.
(Continued)

Primary Examiner — Farid Homayounmehr
Assistant Examiner — Sharif E Ullah
(74) Attorney, Agent, or Firm — KPPB LLP

(57) ABSTRACT

Systems and methods for secure content distribution to playback devices connected to a local network via a residential gateway using secure links are disclosed. One embodiment of the invention includes a content server, a rights management server, a residential gateway configured to communicate with the content server and the rights management server via a network, and a playback device configured to communicate with the residential gateway via a local network. In addition, the residential gateway is configured to receive protected content from the content server, the playback device is configured to request access to the protected content from the residential gateway, the residential gateway is configured to request access to the protected content from the rights management server and the request includes information uniquely identifying the playback device, the rights management server is configured to provide access information to the residential gateway when the information uniquely identifying the playback device
(Continued)

satisfies at least one predetermined criterion with respect to playback devices associated with the residential gateway, the residential gateway and the playback device are configured to create a secure link between the residential gateway and the playback device via the local network, and the residential gateway is configured to decrypt the protected content using the access information provided by the rights management server and to encrypt the decrypted content for distribution to the playback device via the secure link.

32 Claims, 3 Drawing Sheets

Related U.S. Application Data

(60) Provisional application No. 61/365,789, filed on Jul. 20, 2010.

(51) Int. Cl.
*H04N 21/254* (2011.01)
*H04N 21/266* (2011.01)
*H04N 21/436* (2011.01)
*H04N 21/4363* (2011.01)
*H04N 21/4627* (2011.01)
*H04L 12/931* (2013.01)
*H04L 29/08* (2006.01)

(52) U.S. Cl.
CPC .......... *H04L 63/0428* (2013.01); *H04L 67/32* (2013.01); *H04L 67/42* (2013.01); *H04N 21/2541* (2013.01); *H04N 21/26613* (2013.01); *H04N 21/4363* (2013.01); *H04N 21/43615* (2013.01); *H04N 21/4627* (2013.01); *G06F 2221/0717* (2013.01)

(56) References Cited

U.S. PATENT DOCUMENTS

| | | | |
|---|---|---|---|
| 2003/0093694 | A1 | 5/2003 | Medvinsky et al. |
| 2004/0158712 | A1 | 8/2004 | Lee et al. |
| 2006/0242069 | A1 | 10/2006 | Peterka et al. |
| 2007/0180224 | A1* | 8/2007 | Nakano ................ G06F 21/606 713/150 |
| 2009/0307307 | A1* | 12/2009 | Igarashi ............. H04N 7/17309 709/203 |
| 2010/0131973 | A1* | 5/2010 | Dillon ..................... G06F 21/10 725/27 |
| 2013/0179680 | A1 | 7/2013 | Peterka et al. |

OTHER PUBLICATIONS

International Search Report and Written Opinion for International Application No. PCT/US2011/044752, Search completed Nov. 22, 2011, Mailed Dec. 21, 2011, 8 Pgs.
Supplementary European Search Report Application No. EP11810374, International Filing Date Jul. 20, 2011, Search Completed Apr. 9, 2014, 5 pgs.

* cited by examiner

DIGITAL RIGHTS DOMAIN MANAGEMENT FOR SECURE CONTENT DISTRIBUTION IN A LOCAL NETWORK

CROSS REFERENCE TO RELATED APPLICATIONS

This application is a continuation of U.S. application Ser. No. 13/810,886, filed Mar. 26, 2013, which application is a national stage application of PCT Application No. PCT/US11/44752, filed on Jul. 20, 2011, which application claims priority to U.S. Provisional Application No. 61/365,789, filed Jul. 20, 2010, the disclosures of which are hereby incorporated by reference in their entirety.

FIELD OF THE INVENTION

The present invention relates generally to digital rights management and more specifically to digital rights management for secure content distribution on a local network.

BACKGROUND

The concept of a residential gateway device is gaining more attention from content service providers, such as IPTV or DVB operators, as an option for minimizing the number of set top boxes (STBs) in a subscriber's home (typically a significant capital expense for the service provider). A residential gateway is a class of devices that can share content with other playback devices already in the home. Examples of devices that can act as residential gateways include (but are not limited to) set top boxes (STBs) and digital video recorders (DVRs). The Digital Living Network Alliance (DLNA) device communication architecture enables device and content discovery within a local area network and subsequent streaming, or possibly copying of content, between devices connected via a local network. DLNA enables such a business model by treating a single residential gateway as a Digital Media Server (DMS), which receives the service provider's content and redistributes it within the home to client devices called Digital Media Players (DMP) or Digital Media Renderers (DMR). Examples of DMPs and/or DMRs include (but are not limited to) network connected consumer electronics devices such as televisions, game consoles and optical disk players, personal computers, mobile phones, and tablet computers. In addition to using the residential gateway to distribute stored content via the local network, the residential gateway can also be used to distribute linear content being received live, with or without the intermediate recording step.

For premium content, DLNA provides a mechanism to signal content protection in the Content Directory Service (CDS) via a standardized Internet media type (also referred to as a Multipurpose Internet Mail Extensions type or MIME type). By default, DLNA supports Digital Transmission Content Protection for Internet Protocol (DTCP-IP) link protection that is independent of the conditional access/digital rights management technology (CA/DRM) used to deliver the content to the residential gateway by the content service provider. DTCP-IP is a "link protection" technology that protects audiovisual content, when transmitted between digital entertainment products, against unauthorized copying, interception and tampering within the home, while ensuring that content can be viewed and copied on home networked devices. DTCP-IP enables audiovisual content to be transmitted, in an encrypted form, only to those devices within a local network that have authenticated compliance with DTCP. When DTCP-IP is used, the DMS terminates the service provider's CAS/DRM, decrypts the content and re-encrypts it for further distribution within the home over DTCP-IP. CAS/DRM systems typically deliver content with a set of Copy Control Information (CCI) and Usage Rules. DLNA via DTCP-IP has a very limited mechanism to propagate this control, namely using the DTCP-IP Protect Content Packet Usage Rules (PCP-UR) field and/or the DTCP Descriptors. These may suffice for simple streaming to other devices in the home but are not adequate for copying or moving content within the home domain. Moreover, interpretation of the CCI bits can be problematic when content broadcast as "copy-one-generation" is recorded in the residential gateway and stored as "copy-no-more". The end-user experience may be inconsistent if the user starts watching live content still marked as "copy-one-generation" and then pauses and switches to the recorded version of the same content already remarked as "copy-no-more".

Typically, a content service provider has full control of how many devices (e.g. STBs) there are in each home and charges the end user accordingly. When DLNA is used, the operator can deliver content to the residential gateway with no control over which and how many other playback devices the content can be distributed to within the home. DTCP-IP limits content streaming to the local proximity, thus preventing streaming over the Internet to remote locations. Despite DTCP-IP being limited to local content streaming, the operator cannot easily charge for each device (or at least add a percentage to the subscription for each additional device), nor charge a flat fee for content sharing within the home. The operator also does not know whether some devices are "traveling" between locations, potentially sideloading content that was not intended to be shared outside of the home (note that these devices could be legitimate DLNA/DTCP-IP devices, not hacked pirate devices).

Many content owners and service providers desire to limit the period of time a consumer can store a recording in the home. This is easily achievable with many traditional CAS and DRM systems, but DTCP-IP may not provide an adequate set of rights expressions to propagate these rules throughout the home. Similarly, and even more importantly, content recorded and stored in the home should expire when the consumer no longer subscribes to the service or channel. Again, once content "escapes" in the home network, albeit secure, the control the service provider has over such content may be very limited.

SUMMARY OF THE INVENTION

Systems and methods in accordance with embodiments of the invention can enable service providers to control the distribution of protected content within a local network. In many embodiments, rights management servers can control copy control policies in real time based upon the user, the playback device requesting the content and the specific piece of content requested.

One embodiment of the invention includes a content server, a rights management server, a residential gateway configured to communicate with the content server and the rights management server via a network, and a playback device configured to communicate with the residential gateway via a local network. In addition, the residential gateway is configured to receive protected content from the content server, the playback device is configured to request access to the protected content from the residential gateway, the residential gateway is configured to request access to the protected content from the rights management server and the request includes information uniquely identifying the playback device, the rights management server is configured to provide access information to the residential gateway when the information uniquely identifying the playback device satisfies at least one predetermined criterion with respect to playback devices associated with the residential gateway, the residential gateway and the playback device are configured to create a secure link between the residential gateway and the playback device via the local network, and the residential gateway is configured to decrypt the protected content using the access information provided by the rights management server and to encrypt the decrypted content for distribution to the playback device via the secure link.

In a further embodiment, the content server and the rights management server are part of a head end system.

In another embodiment, the residential gateway is a set top box.

In a still further embodiment, the residential gateway includes a digital video recorder.

In still another embodiment, the playback device is configured to discover content accessible via the residential gateway using DLNA.

In a yet further embodiment, the secure link is a DTCP-IP link established using a DTCP certificate resident on the playback device.

In yet another embodiment, the information uniquely identifying the playback device is obtained from the DTCP certificate of the playback device.

In a further embodiment again, the access information includes Copy Control Information.

In another embodiment again, the Copy Control Information forms part of a DTCP descriptor.

In a further additional embodiment, the at least one predetermined criterion with respect to playback devices associated with the residential gateway comprises a predetermined criterion concerning the number of devices that can be associated with the residential gateway.

In another additional embodiment, the at least one predetermined criterion with respect to playback devices associated with the residential gateway accommodates visiting playback devices.

In a still yet further embodiment, the at least one predetermined criterion with respect to playback devices associated with the residential gateway comprises a predetermined criterion concerning the types of devices that can be associated with the residential gateway.

In still yet another embodiment, the residential gateway is associated with a user account, and the at least one predetermined criterion with respect to playback devices associated with the residential gateway comprises a predetermined criterion concerning the number of playback devices associated with the residential gateway and the number of devices associated with the user account that do not communicate with the rights management server via the residential gateway.

In a still further embodiment again, the residential gateway is configured to imperceptibly mark the decrypted content with information indicative of the information uniquely identifying the playback device.

In still another embodiment again, the content server is configured to imperceptibly mark the content with information indicative of the information uniquely identifying the playback device.

In a still further additional embodiment, the information uniquely identifying the playback device further comprises information concerning the capabilities of the playback device.

In still another additional embodiment, the access information includes copy control permissions and the rights management server is configured to provide copy control permissions based upon the information concerning the capabilities of the playback device.

In a yet further embodiment again, the content server is configured to provide content formatted based upon the information concerning at least one of the capabilities of the playback device and restrictions placed on the playback device.

In yet another embodiment again, the access information includes a list of playback devices that can access specific content, and the residential gateway is configured to access the specified content in response to a request from a playback device on the list.

In a yet further additional embodiment, the rights management server is configured to prevent access to content when at least one of an expiration or a play limit criterion is violated.

In yet another additional embodiment, the residential gateway is configured to prevent access to content when at least one of an expiration criterion or a play limit criterion is violated.

In a further additional embodiment again, the residential gateway is configured to transcode the content and is configured to provide a transcode profile with a request to the rights management server to access protected content, and the rights management server is configured to provide access information to the residential gateway when the transcode profile satisfies at least one predetermined criterion with respect to the transcoding of the requested content.

Another additional embodiment again includes a residential gateway configured to communicate with a content server and a rights management server via a network. In addition, the residential gateway is configured to communicate with at least one playback device via a local network, the residential gateway is configured to receive protected content from the content server, the residential gateway is configured to receive requests for access to protected content from playback devices, the residential gateway is configured to request access to protected content on behalf of playback devices from a rights management server and the requests include information uniquely identifying the playback devices, the residential gateway is configured to receive access information from a rights management server when the information uniquely identifying a playback device satisfies at least one predetermined criterion with respect to playback devices associated with the residential gateway, the residential gateway is configured to establish secure links with playback devices via a local network, and the residential gateway is configured to decrypt the protected content using the access information provided by the rights management server and to encrypt the decrypted content for distribution to a playback device via a secure link.

Another additional embodiment again also includes digital video recorder storage.

In a still yet further embodiment again, the residential gateway is configured to imperceptibly mark decrypted content with information identifying a playback device.

Still yet another embodiment again includes a rights management server configured to communicate with at least one residential gateway via a network. In addition, the rights management server is configured to receive a request to access protected content from a residential gateway, where the request includes information uniquely identifying a playback device, and the rights management server is configured to provide access information to a residential gateway when information uniquely identifying a playback device contained within a request to access protected content satisfies at least one predetermined criterion with respect to playback devices associated with the residential gateway.

In a still yet further additional embodiment, the information uniquely identifying a playback device is obtained from a DTCP certificate and the rights management server is configured to generate access information including Copy Control Information.

In still yet another additional embodiment, the Copy Control Information forms part of a DTCP descriptor.

In another further embodiment, the access information includes a list of playback devices authorized to access the protected content.

Still another further embodiment includes receiving a request for content from a playback device at a residential gateway, obtaining information uniquely identifying the playback device using the residential gateway, generating a request for access to the requested content using the residential gateway and including the information uniquely identifying the playback device, receiving access information at the playback device when the request to access the content satisfies at least one predetermined criterion with respect to playback devices associated with the residential gateway, decrypting the requested content based upon the access information using the residential gateway, and encrypting the requested content using the residential gateway for distribution via a secure link to the playback device.

Still yet another further embodiment also includes imperceptibly marking the decrypted content with information indicative of the information uniquely identifying the playback device using the residential gateway.

DETAILED DESCRIPTION

Figure 1:
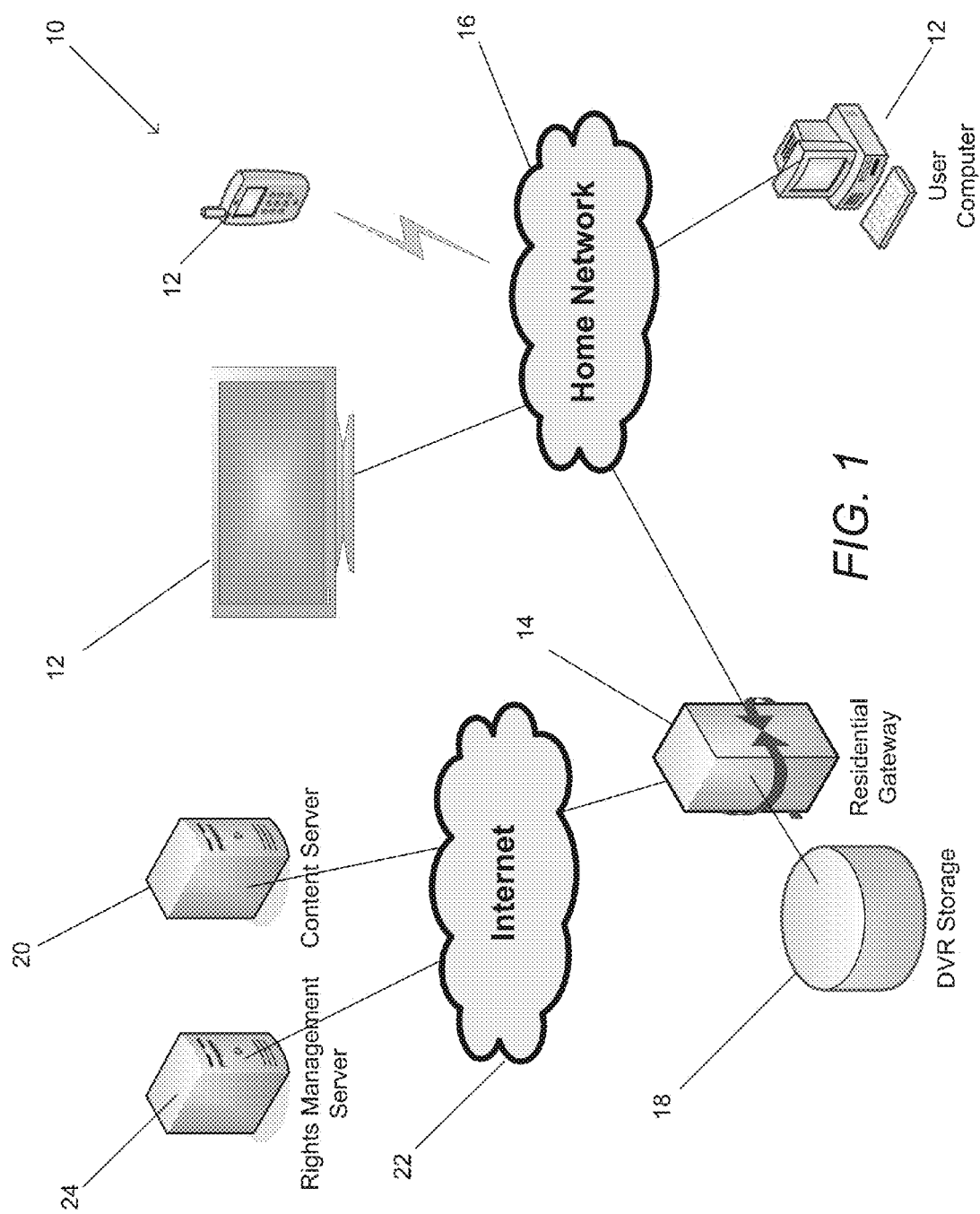
FIG. 1 is a system diagram illustrating a system for secure content distribution to playback devices connected to a local network via a residential gateway using secure links in accordance with an embodiment of the invention.

Turning now to the drawings, systems and methods for secure content distribution to playback devices connected to a local network via a residential gateway using secure links in accordance with embodiments of the invention are illustrated. In many embodiments, a playback device requests a specific piece of content from a residential gateway via a local network. In response to the request, the residential gateway initiates a request to a rights management server for access to the content. The request made by the residential gateway uniquely identifies the playback device that requested the content. The rights management server maintains a list of active playback devices associated with a user's residential gateway. When the rights management server receives a request from a residential gateway to access a specific piece of content, the rights management server compares the information uniquely identifying the playback device contained within the request against the list of active playback devices and determines whether granting the playback device access to the content would violate any domain policies associated with the residential gateway. In the event that the request does not violate any of the domain policies associated with the residential gateway, then the rights management server provides the residential gateway with the necessary access information to access the restricted content. The residential gateway can then decrypt the content requested by the playback device and can forward the content to the playback device via a secure link. In several embodiments, the rights management server also provides Copy Control Information (CCI) to the residential gateway that the residential gateway can forward with the requested content via the secure link. In this way, the system can determine the copy control permissions for a specific piece of content based upon the user and the playback device that requested access to the content.

In several embodiments, the playback device requests the content via DLNA and the residential gateway provides the content to the playback device via DTCP-IP. When DTCP-IP is used as a secure link to provide content to the playback device, the playback device's DTCP-IP certificate can be used by the residential gateway to uniquely identify the playback device to a rights management server. In addition, the rights management server can control the access permissions granted to the playback device by generating a DTCP-IP descriptor with Embedded Copy Control Information (CCI) and Analog Protection System (APS) information associated with the requested content and user. In a number of embodiments, the rights management server can also provide a list of devices currently associated with the user's device domain so that the residential gateway can cache information received from the rights management server and provide content for which the residential gateway has already obtained access permissions from the rights management server to additional playback devices within the user's device domain without having to separately generate a request to the rights management server. Residential gateways, rights management servers and techniques for controlling the distribution of protected content within a local network in accordance with embodiments of the invention are discussed further below.

System Architecture

A system for secure content distribution to playback devices connected to a local network via a residential gateway using secure links in accordance with an embodiment of the invention is illustrated in FIG. 1. The system 10 includes a plurality of playback devices 12 connected to a residential gateway 14 via a local network 16. In the illustrated embodiment, the residential gateway is a Digital Video Recorder (DVR) that includes DVR storage 18. In other embodiments, the residential gateway can be any device configured to receive content from content servers 20 and/or a head end and to communicate with a rights management server 24. In several embodiments, the residential gateway is a set top box, or a game console. In many embodiments, the playback devices include (but are not limited to) network connected consumer electronics devices such as televisions, game consoles and optical disk players, personal computers, mobile phones, and tablet computers. In a number of embodiments, the rights management server is a server associated with a conditional access or digital rights management system. In many embodiments, the rights management server and the content server are part of a VCAS Head-End sold by Verimatrix, Inc. of San Diego, Calif.

The playback devices 12 can request content from the residential gateway 14. The requested content can be content stored in the DVR storage 18 of the residential gateway 14, or content received live by the residential gateway from a content server 24 via the Internet 22. When the residential gateway receives a request from a playback device to access content, the residential gateway initiates a request to a rights management server 24 for access to the content. In order to enforce domain size policies, the request made by the residential gateway 14 includes information uniquely identifying the playback device 12 requesting the content. The rights management server 24 maintains a list of active playback devices 12 associated with the residential gateway 14. If the playback device requesting the content is on the list of active playback devices or is not on the list but the domain policies associated with the residential gateway have not been violated, the request is granted. When the domain size limit is reached or another domain policy is violated (e.g. a specific device or a specific type or category of devices is not permitted to access the content), the rights management server denies the request. A domain policy is a rule relating to the playback devices that can receive content from the residential gateway. Domain policies include (but are not limited to) domain size policies that are rules concerning the number of devices that can receive content from the residential gateway. Other domain policies can include rules with respect to the type of playback devices that can receive content and/or the copy control permissions that are allowed on a specific playback device.

In many embodiments, when a rights management server 20 grants a request to access content the rights management server provides access information to the residential gateway 14. The access information can be any form of information that can be utilized by the residential gateway 14 to access technically protected content. In several embodiments, the access information includes at least one cryptographic key that enables the residential gateway to decrypt the content requested by the playback device 12. In order to provide the requested content to the playback device, the residential gateway 14 establishes a secure link to the playback device 12 over the local network 16 over which the residential gateway can stream the content to the playback device. In several embodiments, local networking technologies such as (but not limited to) Ethernet, MoCA and WiFi, and standard protocols such as UPnP, HTTP, and MPEG-2 TS can be utilized as the underlying infrastructure of the local network over which the content is streamed.

In a number of embodiments, the playback device that requested the content is configured to limit a user's permissions to copy and playback content in response to receipt of copy control information via the secure link. In several embodiments, the rights management server 24 generates the copy control information and provides the copy control information to the residential gateway 14. The residential gateway can append the copy control information to the content streamed via the secure link and the playback device can control the playback of the content according to the copy control information. In this way, the rights management servers can control copy control policies with respect to specific content in real time based upon the user, and the playback device requesting the content. For example, by default, most content may be marked such that recording on the residential gateway is allowed (e.g. copy-one-generation) but further distribution over the local network is marked as "copy-no-more" forcing the receiving devices to only stream and consume the content without the ability to further store the content. In many embodiments, a user may purchase the option to store the content which would then be allowed by the rights management server issuing updated permissions. Systems for distributing content via secure links and the generation of copy permissions in accordance with embodiments of the invention is discussed further below.

Secure Distribution of Content Via DTCP-IP

Figure 2:
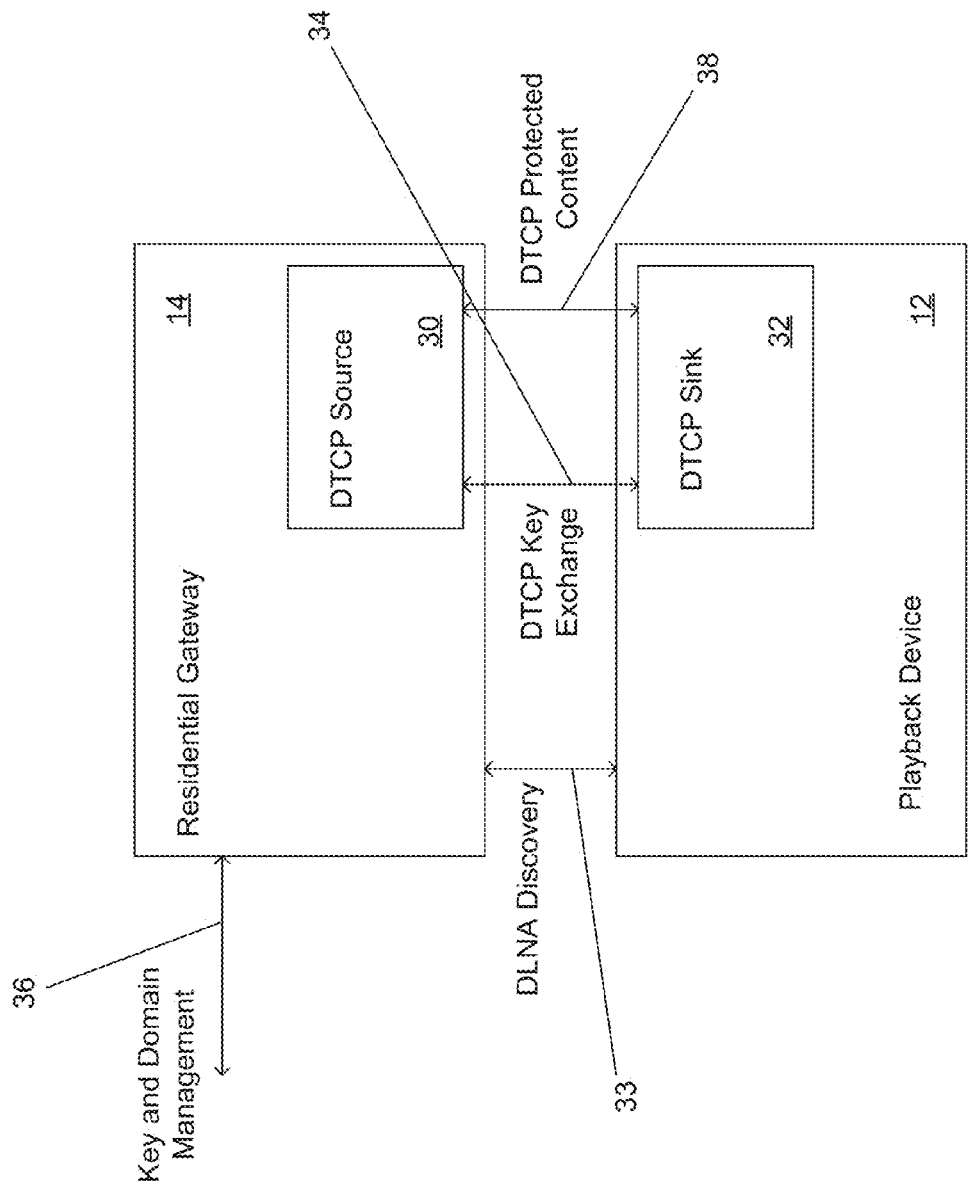
FIG. 2 conceptually illustrates a process for the secure distribution of content between a residential gateway and a playback device via DTCP-IP in accordance with an embodiment of the invention.

A process for the secure distribution of content between a residential gateway and a playback device via DTCP-IP in accordance with an embodiment of the invention is conceptually illustrated in FIG. 2. In several embodiments, playback devices 12 are configured to discover and request content via DLNA and the secure link established between the residential gateway 14 and the playback device 12 is a DTCP-IP link. In systems where DTCP-IP is supported, the residential gateway incorporates a DTCP-IP source 30 and the playback devices incorporate DTCP-IP sinks 32. The playback device 12 can use DLNA discovery (33) to discover content that is available via the residential gateway 14.

When a content request is received from a playback device 12 via DLNA, the residential gateway 14 can establish a DTCP-IP link with the playback device. The establishment of a DTCP-IP link involves a DTCP key exchange (34) in which the playback device 12 provides its DTCP certificate (i.e. an electronic document that binds a public key to the playback device). When the residential gateway 14 receives the DTCP certificate of the playback device 12, the residential gateway 14 can utilize information within the DTCP certificate and/or information derived from the DCTP certificate to uniquely identify the playback device 14 that initiated the content request.

The unique identifier obtained from the DTCP certificate can then be provided (36) to the rights management server by the residential gateway 14 as part of the content request. As noted above, the rights management server can maintain a list of playback devices 12 associated with the residential gateway 14. If the playback device 12 is either on the list, or not on the list but a domain size limit (or other domain policy) has not been violated, then the rights management server 24 determines that the playback device 12 can be granted permission to access the requested content. Otherwise, the rights management server denies the request.

When the rights management server determines that the playback device 12 can be granted permission to access the requested content, the rights management server adds the playback device 12 to the list and/or updates a timestamp indicative of the time the playback device 12 last requested access to content. The rights management server can then send a response (36) containing access information enabling the residential gateway 14 to access the requested content in the clear. In many embodiments, the access information can also include a DTCP-IP descriptor with EMI, CCI and/or APS information associated with the requested content. The residential gateway 14 can then stream (38) content via the DTCP-IP link (optionally including the DTCP-IP descriptor provided by the rights management server). Processes for distributing content via DTCP-IP in accordance with embodiments of the invention are discussed further below.

Processes for Streaming Protected Content Via DTCP-IP

Figure 3:
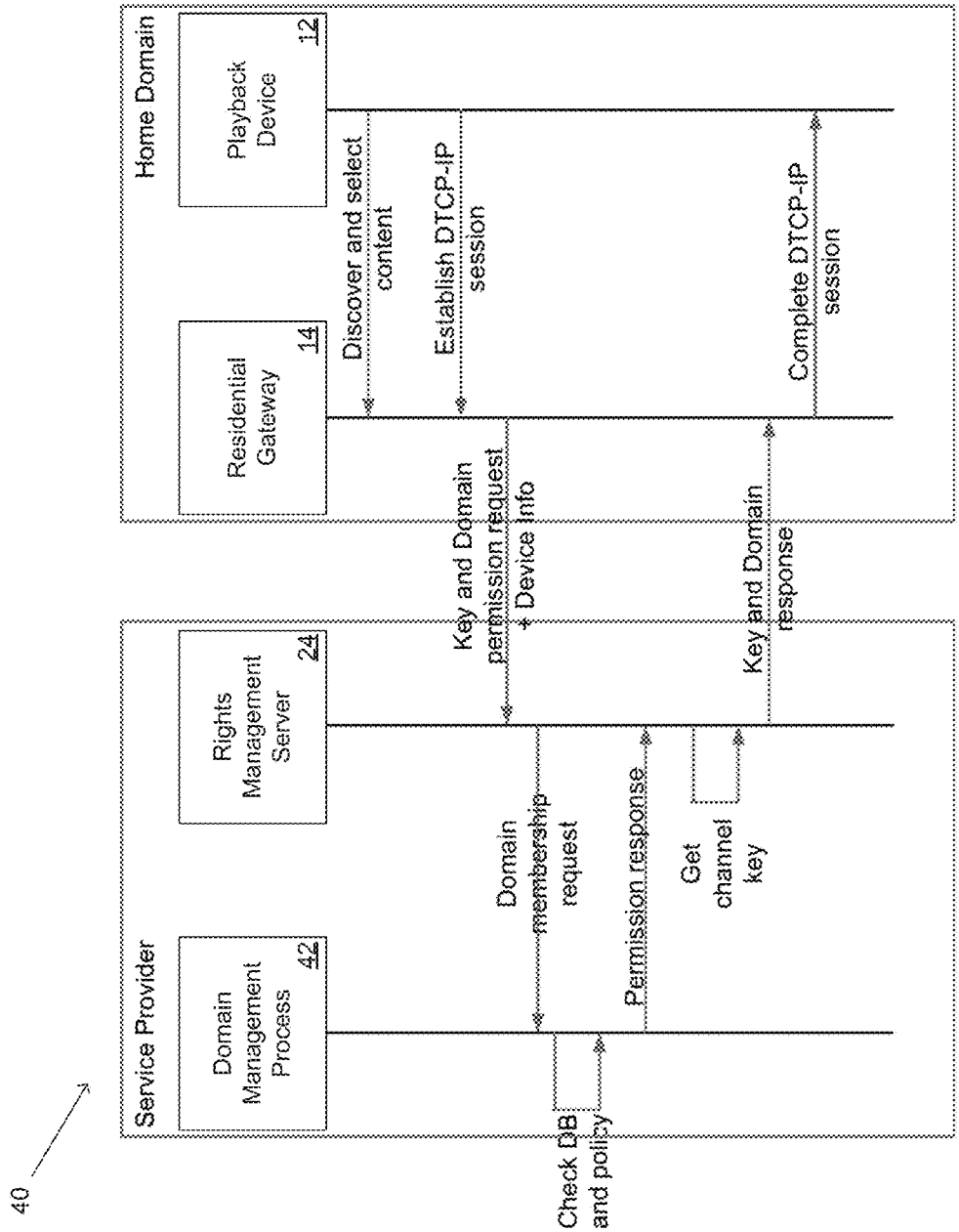
FIG. 3 is an interaction diagram illustrating communications between various devices and process during a process for accessing technically protected content and streaming it via DTCP-IP from a residential gateway to a playback device in accordance with an embodiment of the invention.

A process for obtaining access permissions from a rights management server to stream content via DTCP-IP from a residential gateway to a playback device in accordance with an embodiment of the invention is illustrated in FIG. 3. The process 40 involves a playback device 12 discovering and selecting content for playback from a residential gateway 14 via DLNA or an alternative content discovery process. As part of the request, the playback device 12 establishes a DTCP-IP session, which involves the playback device 12 providing its DTCP certificate to the residential gateway 14. The residential gateway extracts information from the DTCP certificate and provides the information to a rights management server 24 to uniquely identifying the playback device along with a request to access a specific piece of content. The rights management server 24 interacts with a domain management process 42 to determine whether the playback device 12 identified by the residential gateway 14 is within the domain of the residential gateway (i.e. does not violate the domain policies of the residential gateway). In the event that the domain policies for the residential gateway 14 are satisfied, the domain management process 42 provides a response to the rights management server 24 indicating that the playback device is within the domain of the residential gateway 14 and the rights management server 24 obtains the information required to access the technically protected content. In the illustrated embodiment, the playback device requests access to a specific encrypted channel of content and the rights management server retrieves the keys required to decrypt the channel. The access information is provided to the residential gateway 14 by the rights management server 24, and the residential gateway 14 accesses the requested content in the clear. In the illustrated embodiment, the rights management server utilizes the keys provided by the rights management server to decrypt the requested channel and streams the requested content via the DTCP-IP link to the playback device. When playback ceases, the DTCP-IP session between the residential gateway 14 and the playback device 12 is terminated. As noted above, the response provided by the rights management server 24 can include the DTCP descriptors to be utilized by the residential gateway 14 when streaming content to the playback device 12. In this way, the rights management server can enforce copy restrictions with respect to the requested content based upon the user and/or the playback device that requested the content.

Although a specific process is illustrated in FIG. 3, any of a variety of processes can be utilized to share technically protected content via a DTCP-IP link in accordance with an embodiment of the invention that enforces domain policies with respect to the requesting playback device and/or copy control policies with respect to the requested content and the requesting playback device in accordance with embodiments of the invention.

Provisioning Device DTCP Keys

In many embodiments, device manufacturers prefer to avoid payment of DTCP licensing fees unless a user chooses to access the specific functionality on the device. In several embodiments, residential gateways can be manufactured that include the necessary software stack to implement DTCP-IP, however, the residential gateway is not provisioned with DTCP keys until after deployment. When the residential gateway needs to communicate via DTCP-IP with a playback device, the necessary DTCP certificates and keys can be obtained from the rights management server by the residential gateway. The rights management server can account for the number of DTCP certificates requested by residential gateway devices post deployment and license fee payments can be made accordingly. In this way, DTCP license fees can be reduced as can the risk that the DTCP keys will be compromised in devices that are not utilizing DTCP capabilities.

Enforcing Domain Policies

A service provider can maintain domain policies including policies with respect to the number and type of devices that can be associated with a specific residential gateway on a server running a domain management process. The domain management policies can be enforced by maintaining a list of playback devices associated with the residential gateway. In many embodiments, the list includes information concerning each playback device including (but not limited to) a unique identifier for the device, the frequency of the device's use, and/or the last time the device was used. In many embodiments, the domain management process can age devices out of a specific domain when not used for an extended period or a new device may replace the device that has not been used for the longest period of time.

A domain management process may allow a playback device temporarily into the domain (e.g. when the residential gateway is over its device limit) assuming that it is a visiting playback device, rather than a device that is permanently joining the local network. An attribute of such a playback device is that it joins the domain only once or possibly very infrequently. In many embodiments, a visiting device receives fewer rights. For example, all content provided to the visiting playback device is distributed on a "copy never" basis by the residential gateway.

Device Specific Content Security Level and Access Rights

In order to manage a domain associated with a residential gateway and/or user, the residential gateway provides information identifying a playback device to the rights management server. The information identifying the device can be a digital certificate and/or information derived from a digital certificate. In many embodiments, the information also includes device identification information, device vendor information, device manufacturing information, a name and version of a hardware component, and/or a name and version of a software component. The playback device's digital certificate is primarily used to identify the playback device. The rights management server can, however, utilize the additional information to look up the security properties of the device. Security properties can include information concerning the ease of gaining access to unprotected copies of the content via the device (e.g. through frame grabbing, analogue outputs, security of the HDMI/HDCP implementation). In many embodiments, the security properties are assigned as a security level and certain types of content (e.g. early release content) are restricted to playback devices that exceed a predetermined security level or are known to possess specific security properties (e.g. lacking analog outputs or the ability to disable analog outputs).

Device Specific Content Identification

Information utilized to identify a playback device also can be utilized to create a uniquely marked stream that identifies the receiving playback device. Marking can occur with file information embedded in the comment section of the file and/or using robust forensic watermarking including (but not limited to) the processes described in U.S. patent application Ser. No. 13/002,280 "Efficient Watermarking Approaches of Compressed Media" to Niels Thorwirth, filed Feb. 8, 2011. The marking may occur at the content server, or at the residential gateway. In the later case the mark may be assigned when the connection to the content server does not exist any more (e.g. content resident on a DVR associated with a residential gateway). Furthermore, the mark identifying the device may be a mark in addition to already embedded information that identifies other devices or the user associated with the residential gateway.

Device Specific DRM and Format Adaptation

Identification of a playback device that requests content can also allow for determination of the DRM and playback capabilities of the playback device and the content can be adapted accordingly. The two steps of determination of the capabilities and subsequent adaptation may be performed by a rights management server and a content server at the head end or by a rights management server at the head end and a residential gateway in the local network. Device capabilities and adaptation can include (but are not limited to) combining a DRM license and/or decryption information with the file. Depending on the playback device, this information may be in different locations within the file or in a separate file (e.g. appending to the end of file, pre-pending to the beginning of a file, dedicated messages such as MPEG2 ECMs, or dedicated boxes in a .MP4 container). Further adaptions can include remuxing the content into a different container format and/or transcoding and/or transrating one or more of the audio, video and/or subtitles into another format.

Content Expiration

When content recorded on a DVR associated with a residential gateway is requested to be played by a playback device, the residential gateway requests access permissions from a rights management server. At this time a content expiration policy may be checked and if the service provider no longer allows this content to be playable by the user, access to the content is denied by the rights management server. In this way, content distributed via a content distribution network in accordance with an embodiment of the invention can expire.

Offline Permissions

A request to access content can be performed prior to distribution of the content (i.e. prior to the content actually being exchanged between the devices). In this case, the residential gateway may download the content, and request permissions to share the content with all playback devices that are known to be within the domain of the residential gateway. The rights management server can then provide access information (which may include copy control information) and a list of playback devices to the residential gateway. The access information is only used to access the content when a playback device on the list requests access to the content. The access information can be specific to individual content, individual files, or expressed as rules relating to device and or content categories. Device categories can include (but are not limited to) security features, display capabilities and security levels. Content categories can include release windows, pricing information, consumption models and quality levels. Furthermore, usage of the access information can be further limited to a play count or a time interval. An advantage of storing or caching access information is that the server does not have to be available at the time of content transfer in order for a playback device to access the content.

Transcoding Profiles

In many embodiments, the residential gateway is configured to transcode content intended for a playback device. A request to access content that the residential gateway will transcode prior to providing to a playback device can include information that the residential gateway provides to a rights management server concerning an intended transcoding profile. The service provider can have different copy control policies associated with different content resolution. For example, all high definition content may be marked for streaming only (i.e. copy never) while low resolution content may be allowed to be stored on a portable device by marking it copy-one-generation (or even copy-free with EPN). Therefore, the rights management server can determine whether the transcoding profile provided by the residential gateway complies with one or more predetermined criteria concerning the transcoding of a specific piece, set, and/or class of content (collectively specific content) and/or concerning the specific playback device requesting the transcoded content.

System Management

A rights management server in accordance with embodiments of the invention can maintain a list of the playback devices associated with a user account. In this way, a service provider can automatically charge the owner of the residential gateway based upon the number of additional devices that are accessing content via the residential gateway. In addition, the rights management server can be utilized to sell additional access permissions for content. For example, content can initially be distributed for streaming over the local network only. A user desiring to download a copy of the content to a local device can purchase the rights from the rights management server and the rights management server can issue updated access permissions to the residential gateway. In embodiments that utilized DTCP-IP links between residential gateways and playback devices, the updated playback permissions can include a new DTCP-IP descriptor modifying the CCI information with respect to one or more playback devices within the local network associated with the device domain of the residential gateway.

Domain Mapping

By managing a domain associated with a specific user and/or residential gateway via a remote server, service providers can manage playback devices that are part of a user's domain but not part of the local network. For example, a domain management server can include devices that do not access content via a user's residential gateway and that are registered to the user's account within the user's device domain. In addition, the access to content may be in accordance with multiple digital rights management (DRM) systems including DRM systems that include domain concepts. Where a DRM system includes a domain concept, a domain management process in accordance with embodiments of the invention can verify that providing access to a specific piece of content via a secure link does not violate the domain policy of the service provider or of the DRM associated with the requested content.

While the above description contains many specific embodiments of the invention, these should not be construed as limitations on the scope of the invention, but rather as an example of one embodiment thereof. For example, embodiments of the invention are not limited to usage of DTCP-IP secure links but can utilize any of a variety of types of secure link including links that are established without exchange of digital certificates. When a secure link does not use the exchange of a digital certificate, the playback device can be uniquely identified using any of a variety of different types of device identification and/or fingerprinting technique. Accordingly, the scope of the invention should be determined not by the embodiments illustrated, but by the appended claims and their equivalents.

What is claimed:
1. A content distribution system, comprising:
a residential gateway configured to communicate with a content server and a rights management server at a head end system via a network, where the residential gateway comprises a first network-connected electronics device; and
a playback device configured to communicate with the residential gateway via a local network, where the playback device comprises a second network-connected electronics device;

wherein the residential gateway is configured to receive protected content from the content server, where the protected content is encrypted such that the protected content can be decrypted using at least one cryptographic key;

wherein the playback device is configured to request access to the protected content from the residential gateway;

wherein the residential gateway is configured to request access to the protected content from the rights management server and the request includes information uniquely identifying the playback device;

wherein the residential gateway is configured to receive access information from the rights management server when the information uniquely identifying the playback device satisfies at least one predetermined criterion with respect to playback devices associated with the residential gateway, where the at least one predetermined criterion with respect to playback devices associated with the residential gateway comprises a predetermined criterion concerning whether the playback device is on a list of active playback devices associated with the residential gateway and where the access information comprises the at least one cryptographic key that enables the residential gateway to decrypt the protected content;

wherein the residential gateway and the playback device are configured to create a secure link between the residential gateway and the playback device via the local network; and wherein the residential gateway is configured to decrypt the protected content using the access information provided by the rights management server and to reencrypt the decrypted content for distribution to the playback device via the secure link.

2. The system of claim 1, wherein the residential gateway is a set top box.

3. The system of claim 2, wherein the residential gateway includes a digital video recorder.

4. The system of claim 1, wherein the playback device is configured to discover content accessible via the residential gateway using DLNA (Digital Living Network Alliance) communications.

5. The system of claim 4, wherein the secure link is a DTCP-IP (Digital Transmission Content Protection for Internet Protocol) link established using a DTCP (Digital Transmission Content Protection) certificate resident on the playback device.

6. The system of claim 5, wherein the information uniquely identifying the playback device is obtained from the DTCP (Digital Transmission Content Protection) certificate of the playback device.

7. The system of claim 6, wherein the access information includes Copy Control Information.

8. The system of claim 7, wherein the Copy Control Information forms part of a DTCP (Digital Transmission Content Protection) descriptor.

9. The system of claim 1, wherein the at least one predetermined criterion with respect to playback devices associated with the residential gateway comprises a predetermined criterion concerning the number of devices that can be associated with the residential gateway.

10. The system of claim 9, wherein the at least one predetermined criterion with respect to playback devices associated with the residential gateway accommodates visiting playback devices.

11. The system of claim 1, wherein the at least one predetermined criterion with respect to playback devices associated with the residential gateway comprises a predetermined criterion concerning the types of devices that can be associated with the residential gateway.

12. The system of claim 1, wherein:
the residential gateway is associated with a user account; and
the at least one predetermined criterion with respect to playback devices associated with the residential gateway comprises a predetermined criterion concerning the number of playback devices associated with the residential gateway and the number of devices associated with the user account that do not communicate with the rights management server via the residential gateway.

13. The system of claim 1, wherein the residential gateway is configured to imperceptibly mark the decrypted content with information indicative of the information uniquely identifying the playback device.

14. The system of claim 1, wherein the information uniquely identifying the playback device further comprises information concerning the capabilities of the playback device.

15. The system of claim 14, wherein the access information includes copy control permissions and the residential gateway is configured to receive copy control permissions from the rights management server based upon the information concerning the capabilities of the playback device.

16. The system of claim 1, wherein:
the access information includes a list of playback devices that can access specific content; and
the residential gateway is configured to access the specified content in response to a request from a playback device on the list.

17. The system of claim 1, wherein the residential gateway is configured to prevent access to content when at least one of an expiration criterion or a play limit criterion is violated.

18. The system of claim 1, wherein the information uniquely identifying the playback device further comprises a name and version of a software component.

19. The system of claim 18, wherein the information uniquely identifying the playback device is used to look up security properties of the device and the protected content is restricted to the playback device when the playback device exceeds a predetermined security level based upon the security properties.

20. The system of claim 18, wherein:
wherein the information uniquely identifying the playback device is used to look up security properties of the device and the residential gateway is configured to transcode the video of the content into another format based on the security properties of the device.

21. The system of claim 1, wherein the information uniquely identifying the playback device further comprises information identifying a user associated with the playback device.

22. The system of claim 19, wherein the access information includes copy control permissions and the residential gateway is configured to cache information received from the rights management server so that the playback device can access the protected content when the rights management server is not available to the playback device.

23. The system of claim 1, wherein the playback device is removed from the list of active playback devices associated with the residential gateway after a predetermined period of time.

24. The system of claim 1, wherein the playback device is a visiting playback device that receives fewer rights than other devices associated with the residential gateway.

25. The system of claim 24 where the playback device receives a "copy never" permission with respect to the protected content.

26. The system of claim 1, wherein the information uniquely identifying the playback device further comprises device manufacturing information and the protected content is restricted to the playback device based on the device manufacturing information.

27. The system of claim 25, wherein the protected content being restricted to the playback device comprises transcoding the protected content.

28. The system of claim 1, wherein the residential gateway is configured to imperceptibly mark the decrypted content with information indicative of the playback device and user associated with the residential gateway.

29. The system of claim 1, wherein the playback device is configured to imperceptibly mark the decrypted content with information indicative of the information uniquely identifying the playback device using watermark information received from the residential gateway.

30. The system of claim 14, wherein the content server is configured to transcode the video of the content into another format based upon the information concerning at least one of the capabilities of the playback device.

31. The system of claim 1, wherein the residential gateway is configured to cache the access information and provide the access information to a second playback device in response to a request for access from the second playback device without requesting the access information from the rights management server.

32. The system of claim 1, wherein the residential gateway is configured to receive updated copy control permissions that change the copy control permissions from streaming-only to allowing download of the content.

* * * * *